(12) United States Patent
Parker et al.

(10) Patent No.: US 8,096,740 B1
(45) Date of Patent: Jan. 17, 2012

(54) RETRACTABLE CARGO STRAP

(76) Inventors: Chester V. Parker, Houma, LA (US);
Carrie Ledet, Houma, LA (US)

( * ) Notice: Subject to any disclaimer, the term of this patent is extended or adjusted under 35 U.S.C. 154(b) by 331 days.

(21) Appl. No.: 12/319,619

(22) Filed: Jan. 9, 2009

Related U.S. Application Data

(60) Provisional application No. 61/010,634, filed on Jan. 11, 2008.

(51) Int. Cl.
*B61D 45/00* (2006.01)

(52) U.S. Cl. ........................................ 410/103

(58) Field of Classification Search ................ 410/103, 410/100, 97, 12; 254/213, 217, 222, 364, 254/367, 376
See application file for complete search history.

(56) References Cited

U.S. PATENT DOCUMENTS

| | | | | |
|---|---|---|---|---|
| 2,942,867 | A * | 6/1960 | Rumsey | 267/120 |
| 2,946,563 | A * | 7/1960 | Eaton | 410/37 |
| 2,991,975 | A * | 7/1961 | Alexander | 410/103 |
| 3,101,927 | A * | 8/1963 | Gray | 410/103 |
| 4,011,974 | A | 3/1977 | Scarola | |
| 4,063,712 | A * | 12/1977 | Arbogast | 410/37 |
| 4,216,922 | A | 8/1980 | Weman | |
| 4,382,736 | A * | 5/1983 | Thomas | 410/104 |
| 4,564,308 | A | 1/1986 | Ikegami et al. | |
| 4,842,458 | A * | 6/1989 | Carpenter | 410/3 |
| 4,860,408 | A | 8/1989 | Johnson | |
| 5,217,208 | A * | 6/1993 | Stephenson | 254/213 |
| 5,314,275 | A * | 5/1994 | Cottrell et al. | 410/26 |
| 5,738,471 | A | 4/1998 | Zentner et al. | |
| 5,800,105 | A | 9/1998 | Stump | |
| 6,059,499 | A | 5/2000 | Bird | |
| 7,090,450 | B1 * | 8/2006 | Carter | 410/103 |
| 7,527,462 | B2 * | 5/2009 | Chou | 410/103 |
| 2004/0013490 | A1 * | 1/2004 | Cauchon | 410/103 |
| 2007/0264098 | A1 * | 11/2007 | Chou | 410/103 |

* cited by examiner

*Primary Examiner* — H Gutman
(74) *Attorney, Agent, or Firm* — Montgomery Patent & Design, LLC; Robert C. Montgomery; Joseph T. Yaksich

(57) ABSTRACT

An apparatus designed to aid in the winding of cargo straps used on flatbed trailers of tractor-trailer rigs comprising a metal cylinder with an internal power/spiral spring is herein disclosed. A first end of the cylinder is closed with an outer spring case while a second end is slipped through a standard cargo strap winch bracket system commonly found on conventional flatbed tractor-trailers. A similar arrangement is used on all cargo straps systems on a truck. The user pulls out enough strap to anchor on an opposite side of the truck and over a carried load. The strap is then tightened and cinched down in a conventional manner. When unloaded, a lever is released, and the entire cargo strap is quickly retracted back onto the winch shaft. This not only represents huge timesavings for the truck driver, but also protects the stored cargo strap from damage.

8 Claims, 5 Drawing Sheets

RETRACTABLE CARGO STRAP

RELATED APPLICATIONS

The present invention was first described in U.S. Provisional Patent Application No. 61/010,634 filed on Jan. 11, 2008, the entire disclosures of which are incorporated herein by reference.

FIELD OF THE INVENTION

The present invention relates generally to a retractable cargo strap assembly comprising a winch plate and a spring plate for winding a cargo strap between a fully deployed state and a fully retracted state for securing a load thereon a trailer.

BACKGROUND OF THE INVENTION

Load straps are used to secure loads, primarily on flat bed trailer of tractor-trailer rigs. These straps readily adapt to any size load and securely hold such loads for long distances across interstate highways. If not used properly, loads can move about and possibly fall from the truck. If the cargo straps are tightened too tightly, they may damage the load or cause the strap to excessively wear and break. Much time is taken to ensure that the cargo straps are properly applied. This excessive time may cause many users to not properly apply the straps in an effort to save time. Also, after unloading a truck, all loose straps must be wound up on their reel, which, once again, takes a good deal of time. Accordingly, there is a need for a means by which load straps can be quickly and properly applied and rewound without risk of the dangers listed above. The development of the mechanism herein described fulfills this need.

The present mechanism comprises an apparatus designed to aid in the winding of cargo straps used on flat-bed trailers of tractor-trailer rigs comprising a metal cylinder with an internal helical spring. A first end of the cylinder is a closed outer spring case while a second end is a winching gear and locking assembly, both of which are mounted to a standard cargo strap winch system commonly found on conventional flat bed tractor trailers. A similar arrangement is used on all cargo winch systems on a truck. To use the invention, the user simply pulls out enough strap to anchor on an opposite side of the truck and over a carried load. The strap is then tightened and cinched down in a conventional manner. When unloaded, a lever is simply released, and the entire cargo strap is quickly retracted back onto a winch shaft. This not only represents a huge time savings for the truck driver, but also protects the stored cargo strap from damage.

Several attempts have been made in the past to secure cargo to vehicles particularly using strap and tie-down mechanisms. U.S. Pat. No. 4,011,974, issued in the name of Scarola, describes an apparatus for securing cargo to a vehicle comprising an elongated flexible member having a fastening mechanism attached to one (1) end for securing said end to said vehicle. However, unlike the present mechanism, the Scarola cargo strap is intended for use with a passenger vehicle and utilizes a mechanical screw to tighten the flexible strapping member.

U.S. Pat. No. 6,059,499, issued in the name of Bird, discloses a retractable strap assembly comprising a spool having wound strapping member and a spring entirely within a mountable housing assembly. However, unlike the present mechanism, the Bird retractable cargo securement strap comprises elongated arms and pivoting members to operate the retractable spool assembly does not provide a mechanism to ratchet down the cargo strap into a tight and secure position.

Other known prior art cargo securement straps and spring mechanisms include U.S. Pat. Nos. 4,860,408, 4,216,922, and 4,564,308.

The prior art appears to disclose various attempts at cargo securement using strapping members. However, none of the prior art particularly describes an apparatus comprising a cargo strap winching shaft, a winch assembly for tightening said strap, and a spring assembly for automatically retracting said strap after use. Accordingly, there exists a need for a retractable cargo strap that operates without the disadvantages as described above.

SUMMARY OF THE INVENTION

In view of the foregoing disadvantages inherent in the prior art, it has been observed that there is need for a retractable cargo strap for securing loads as used on flat bed trailer of tractor-trailer rigs.

To achieve the above objectives, it is an objective of the present invention to provide a retractable cargo strap comprising a winch assembly, a spring assembly, a winch shaft, a spring, and a plurality of winch locking levers.

A further object of the present invention is to provide a retractable cargo strap comprising a means for retrofitting a standard trailer winch device commonly used on flat bed trailer of tractor-trailer rigs which provides a means of securing a load during transport.

Yet another object of the present invention is to provide an adapter plate which provides a means of attaching the winching assembly to an existing trailer winch device and a means of mounting and connecting the components of the winch assembly.

Yet another object of the present invention is to provide a winch shaft which provides a means of attaching a cargo strap to the winch assembly via a strap aperture and a means of winding said cargo strap in a compact and secure position when not is use.

Yet still another object of the present invention is to provide a spring assembly comprising an outer spring case, a spring, and a spring coupling which provides a means of automatically rotating the winch shaft and retracting the cargo strap.

Yet another object of the present invention is to provide an outer spring case which provides a means of housing the internal components of the spring assembly and provides a means of securing a first end of the spring.

Yet still another object of the present invention is to provide a spring coupling which provides a means of securing a second end of the spring, connecting the winch shaft to the spring, and transferring the rotational motion of said winch shaft to potential energy which is stored in said spring.

Yet another object of the present invention is to provide a spring which stores energy when compressed due to the rotation of the winch shaft and spring coupling as the cargo strap is deployed.

Yet still another object of the present invention is to provide a winch lock gear which provides a means of locking the winch shaft and thus the cargo strap in a desired location.

Yet still another object of the present invention is to provide a load lock lever which provides a means of engaging the winch lock gear in a one-way ratcheting manner thus allowing the winch shaft to rotate in the direction of strap deployment but preventing rotation in the direction of strap retraction due to the spring.

Yet still another object of the present invention is to provide an alternate retractable cargo strap comprising substantially the same objectives as stated above but provided as one (1) integral apparatus.

Yet another object of the present invention is to provide a method for utilizing a retractable cargo strap.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
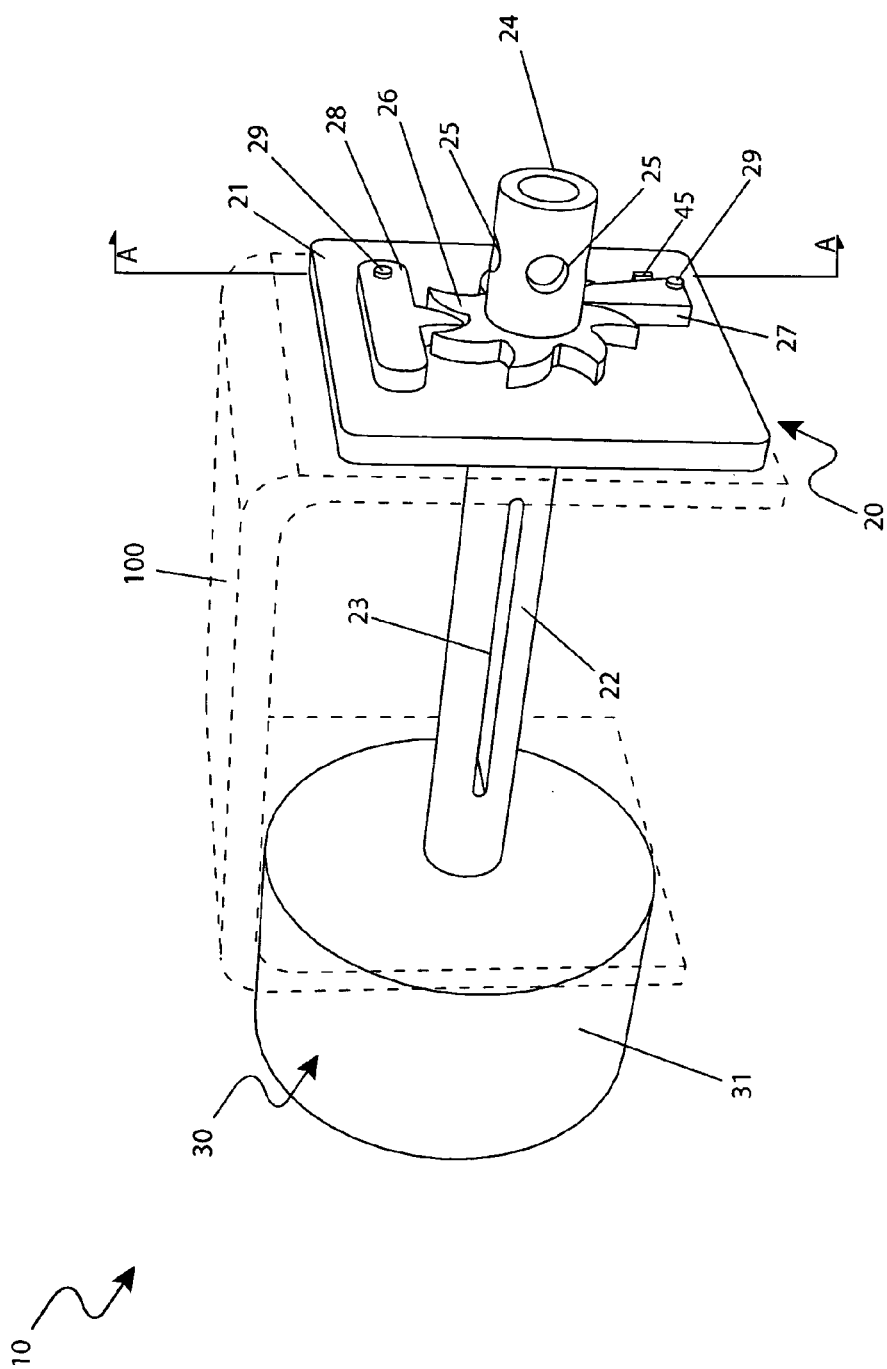
FIG. 1 is a front environmental view of a retractable cargo strap 10, according to a preferred embodiment of the present invention.

| | |
|---|---|
| 10 | retractable cargo strap |
| 20 | winch assembly |
| 21 | adaptor plate |
| 22 | winch shaft |
| 23 | strap aperture |
| 24 | ratchet cap |
| 25 | winch bar aperture |
| 26 | winch lock gear |
| 27 | load lock lever |
| 28 | spring lock lever |
| 29 | lever mounting pin |
| 30 | spring case assembly |
| 31 | outer spring case |
| 32 | spring coupling |
| 33 | keyed aperture |
| 34 | keyed end |
| 35 | spring coupling brackets |
| 36 | shaft aperture |
| 37 | first fastener aperture |
| 38 | second fastener aperture |
| 40 | spring |
| 42 | spring mounting slot |
| 43 | fastener |
| 44 | washer |
| 45 | backstop |
| 50 | alternate retractable cargo strap |
| 60 | retractable cargo strap bracket |
| 65 | mounting aperture |
| 70 | alternate winch assembly |
| 80 | alternate spring assembly |
| 81 | alternate outer spring case |
| 100 | trailer winch bracket |
| 102 | bracket shaft aperture |
| 105 | winch strap |
| 110 | trailer |
| 115 | load |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a retractable cargo strap (herein described as the "apparatus") 10, which provides a means for winding cargo straps used on a flatbed trailer 110 of a tractor-trailer rig. The apparatus 10 is intended to be utilized as a retrofit to existing trailer winch bracket 100 and winch strap 105 and comprises a winch assembly 20 and a spring assembly 30. The winch assembly 20 comprises an adapter plate 21, a winch shaft 22, a ratchet cap 24, a winch lock gear 26, a load lock lever 27, and a spring lock lever 28. The spring assembly 30 comprises an outer spring case 31, a spring coupling 32, and a spring 40. To use the apparatus 10, a user simply pulls out enough of the existing strap 105 to go over a carried load 115 and anchors said strap 105 thereon an opposite side of the truck trailer 110. The excess existing strap 105 is then wound back onto the winch shaft 22 by the apparatus 10 and said strap 105 is then tightened and cinched down in a conventional manner. When unloading, after the load 115 is un-secured in a conventional manner, the entire existing cargo strap 90 is quickly retracted back onto the winch shaft 22 by the apparatus 10. This not only represents a huge time savings for the truck driver, but also protects the stored existing winch strap 105 from damage. The apparatus 10 would further be provided as an entire new trailer winch with an integral alternate retractable cargo strap 50.

Figure 2:
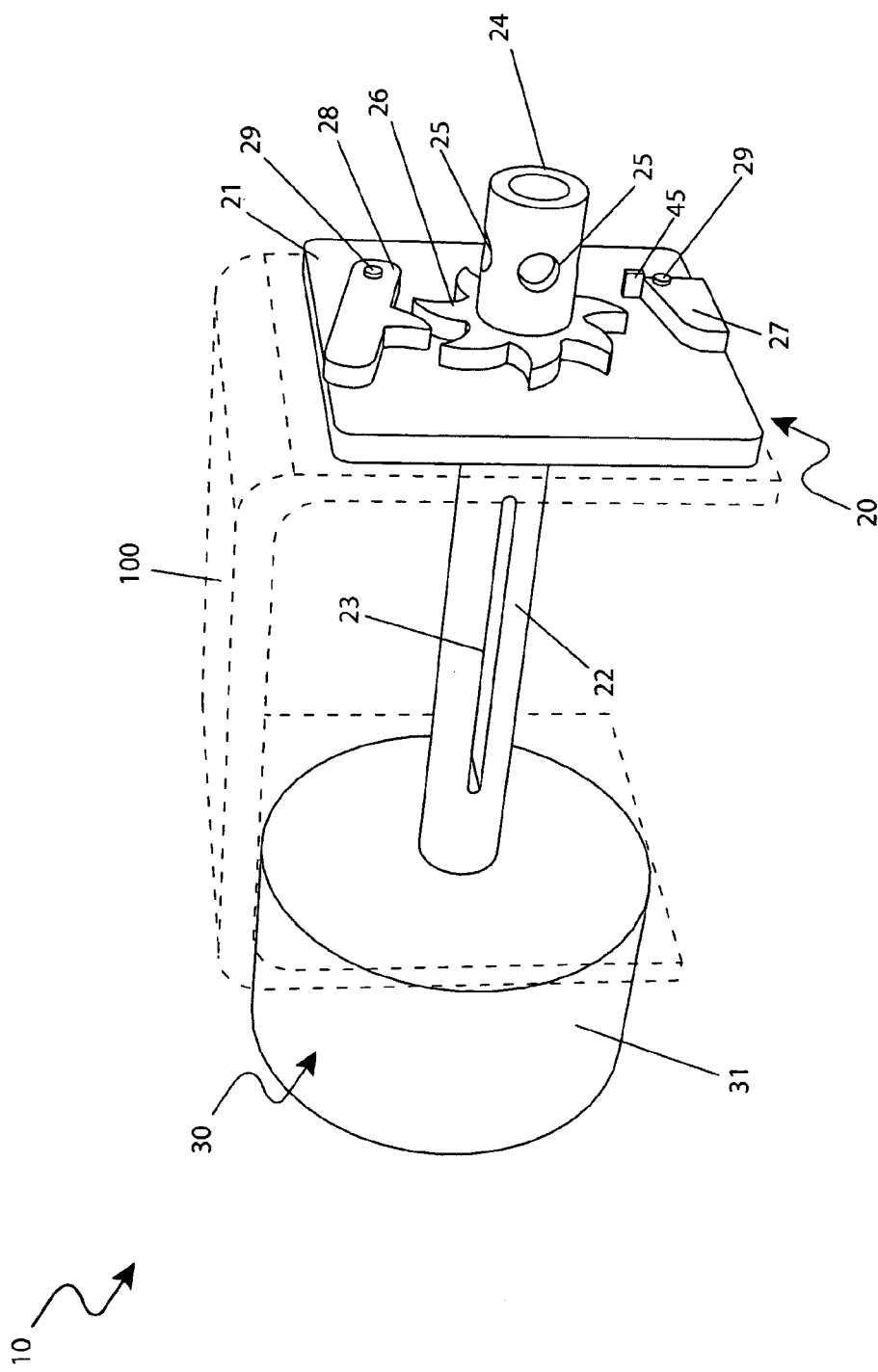
FIG. 2 is a front environmental view of the retractable cargo strap 10 depicted in an in use state, according to a preferred embodiment of the present invention.

Referring now to FIGS. 1 and 2, front environmental views of the apparatus 10, according to the preferred embodiment of the present invention, is disclosed. The apparatus 10 in the preferred embodiment is a retrofit kit for existing trailer winches commonly used with a trailer 110. The existing winch commonly comprises a winch shaft, a bracket shaft aperture 102, a locking gear, and a locking lever. The existing winch shaft, locking gear, and locking lever are removed to enable the attachment of the apparatus 10.

The apparatus 10 comprises two (2) main components preferably made of fabricated metal which are attached to the existing trailer winch bracket 100. The winch assembly 20 and spring assembly 30 are attached to outside vertical surfaces of the existing trailer winch bracket 100 via welding or similar metal fastening techniques. The winch assembly 20 comprises an adapter plate 21, a winch shaft 22, a ratchet cap 24, a winch lock gear 26, a load lock lever 27, and a spring lock lever 28. The adapter plate 21 is preferable a flat piece of fabricated metal which provides a means to mount the remaining components of the winch assembly 20 and a mounting and attaching surface to the existing winch bracket 100. The winch shaft 22 comprises a strap aperture 23 therethrough which receives and secures the winch strap 105 thereto said winch shaft 22. The winch shaft 22 is inserted therethrough a through hole near a center portion of the adapter plate 21 and is freely rotatable therewithin. The winch lock gear 26 is rigidly attached thereto a first end of the winch shaft 22 and comes in contact with an outside vertical surface of the adapter plate 21. The load lock lever 27 is hingedly attached to the adapter plate 21 via a lever mounting pin 29 which is preferably welded thereto said adapter plate, although a shoulder bolt, a rivet, or the like may also be used. The load lock lever 27 provides a means of securing the winch lock gear 26 into a desired position after the winch shaft 22 has been turned during the process of tightening the winch strap 105. The load lock lever 27 is illustrated in FIG. 1 engaged with the winch lock gear 26, thus locking said winch lock gear 26 and winch shaft 22 in a desired position. The load lock lever 27 is held in position by the force exerted from the tensioned winch strap 105 via the winch shaft 22 and the winch lock gear 26 and a backstop 45. The backstop 45 provides a means of preventing the load lock lever 27 from over rotating due to the force applied by the winch lock gear 26 having a tendency to rotate in a direction of deployment of the winch strap 105 when in tension. When in a non-engaged state, the load lock lever 27 drops via gravity, thereby disengaging the winch lock gear 26 and allowing the winch shaft 22 and said winch lock gear 26 to rotate unimpeded (see FIG. 2).

The spring lock lever 28 is hingedly attached to the adapter plate via a lever mounting pin 29, a shoulder bolt, a rivet, or the like. The spring lock lever 28 provides a means of preventing the winch shaft 22 and the winch lock gear 26 from rotating and retracting the winch strap 105 due to the force exerted by the spring 40 upon said winch shaft 22. The spring lock lever 28 acts as a dog-type mechanism and engages the winch lock gear 26 allowing one way rotation of said winch lock gear 26 (see FIG. 1). The spring lock lever 28 is capable of rotating in an upward direction about the lever mounting pin 29, thus enabling the winch lock gear 26 to rotate in the direction of the deploying winch strap 105 as said winch strap 105 is drawn from the apparatus 10 (see FIG. 2). The spring lock lever 28 can also be rotated in an upward direction thus completely disengaging from the winch lock gear 26 in order to allow the spring 40 to uncoil from a compressed state, as when the winch strap 105 is deployed, thus retracting said winch strap 105 back to the apparatus 10. The winch shaft 22 further comprises a ratchet cap 24 located thereon the first end adjacent to the winch lock gear 26. The ratchet cap 24 comprises a plurality of winch bar apertures 25 which receive a standard winch bar used to tighten the winch strap 105 over the load 115.

Figure 3:
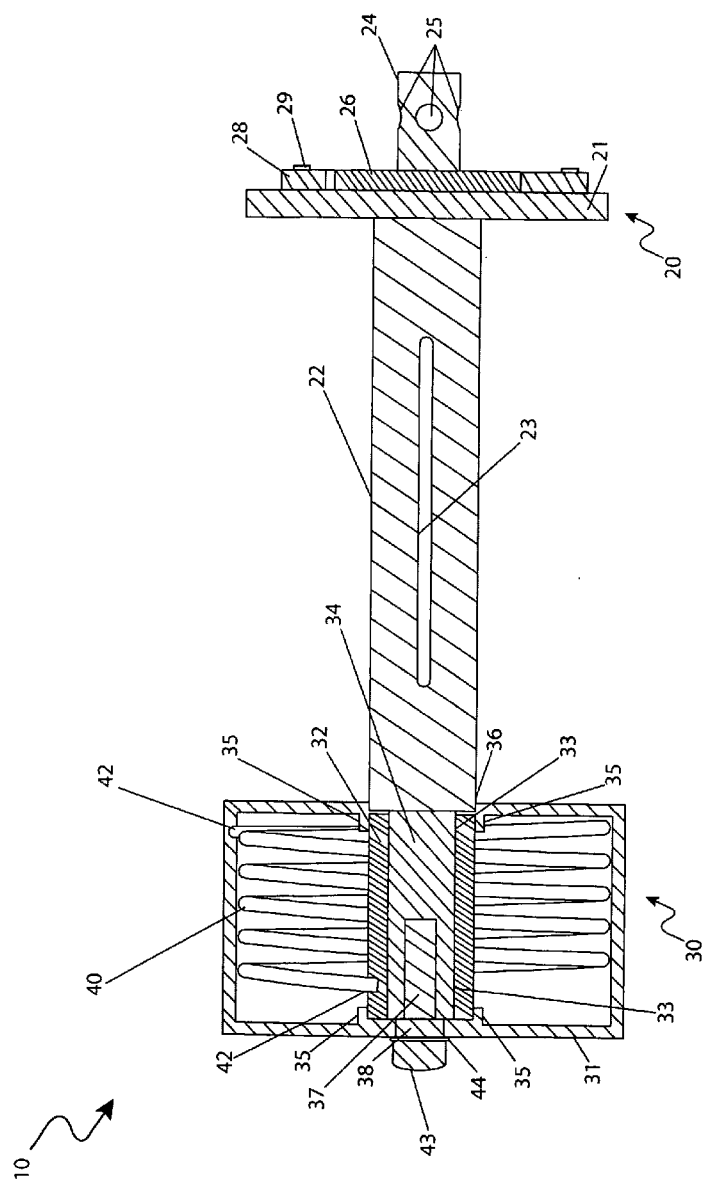
FIG. 3 is an enlarged sectional view as taken along section line A-A (see FIG. 1) of the retractable cargo strap 10, according to a preferred embodiment of the present invention.

Referring now to FIG. 3, an enlarged sectional view taken along section line A-A of the apparatus 10, according to the preferred embodiment of the present invention, is disclosed. The spring case assembly 30 comprises an outer spring case 31 with a spring coupling 32 and an internal power/spiral spring 40. In the preferred embodied retrofit form the apparatus 10 would be an add-on to an existing winch 100 which is normally attached by welding, bolting, or other suitable means, and upgrades said existing winch 100 to provide a means for a spring-operated retractable winch strap 105. The outer spring case 31 is preferably manufactured in a standard metal fabrication process and provides a housing means to the internal components of the apparatus 10. The outer spring case 31 further comprises a shaft aperture 36 through which the winch shaft 22 can be inserted. The spring 40 is fabricated of commonly used spring materials such as stainless steel, beryllium copper, phosphor bronze, or the like. The remaining components are all preferably steel, but other materials such as stainless steel, aluminum, brass, or the like may be used.

The spring coupling 32 fits inside the outer spring case 31 and is free to rotate along with the winch shaft 22 as the winch strap 105 is deployed and retracted. The outer spring case 31 comprises two (2) sets of spring coupling brackets 35 located thereon a center region of an inner sidewall of said outer spring case 31. The spring coupling brackets 35 maintain the centrally-located position of the spring coupling 32 while not hindering rotation therein. The spring coupling 32 insertingly receives the winch shaft 22 such that any rotational motion from said winch shaft 22 is transferred to said spring coupling 32 and thus to the spring 40.

The winch shaft 22 comprises a keyed end 34 located thereon a second end opposing the winch lock gear 26 which is inserted therein a keyed aperture 33 located therethrough the spring coupling 32. The spring 40 is rigidly fastened thereto the spring coupling 32 on a first end thereat a spring mounting slot 42 and thereto an inside surface of the outer spring case 31 thereat a spring mounting slot 42 such that as said spring coupling 32 rotates as the winch strap 105 is deployed, the spring 40 compresses. A fastener 43 is provided to secure the winch assembly 20 and the winch shaft 22 to the spring assembly 30 and the spring coupling 32. The fastener 43 is preferably a shoulder bolt or similar mechanical fastener which enables the rotation of the fastened spring coupling 32 and winch shaft 22. The outer spring case 31 comprises a threaded first fastener aperture 38 and the keyed end 34 of the winch shaft 22 comprises a threaded second fastener aperture 37 which threadingly accept the fastener 43. A washer 44 is further provided to reduce friction and wear therebetween the outer spring case 31 and the fastener 43. The winch assembly 20 and the spring assembly 30 are envisioned to vary depending on type of winch 100 that they are designed to fit.

Figure 4:
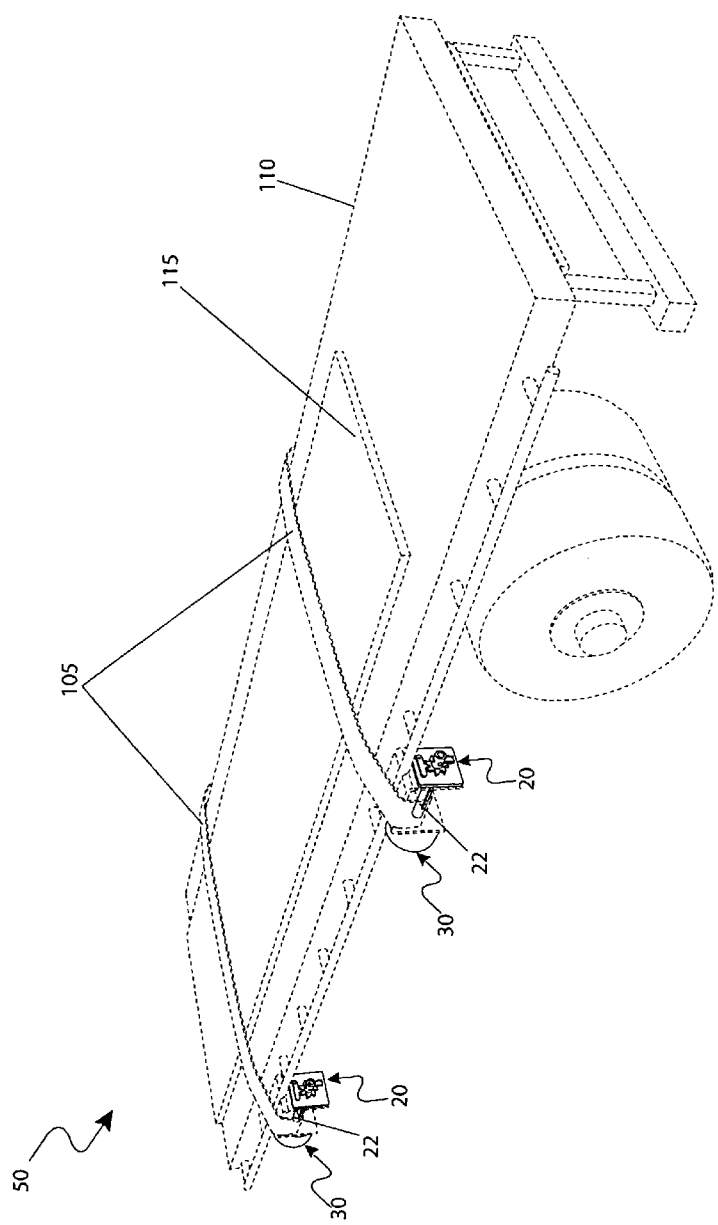
FIG. 4 is a environmental view of the retractable cargo strap 10, according to a preferred embodiment of the present invention; and, FIG. 5 is a front perspective view of an alternate retractable cargo strap 50, according to an alternate embodiment of the present invention.

Referring now to FIG. 4, an environmental view of the apparatus 10, according to the preferred embodiment of the present invention, is disclosed. The apparatus 10 is retrofittingly attached to the existing winch 100 which is either mounted thereto or will be mounted thereon a mounting ridge of the trailer 110. The apparatus 10 can be attached to a plurality of existing trailer winches 100 which are mounted thereto a trailer 110 using standard mounting techniques such as, welding, clamping, bolting, or the like. The winch strap 105 is then attached thereto the winch shaft 22 thereat the strap aperture 23 and wound therearound said winch shaft 22. The winch strap 105 can be deployed therefrom the apparatus 10 and used to secure a load 115 which is being hauled by the trailer 110. When the winch strap 105 is no longer required, it is unsecured from the trailer 110 and can be automatically retracted back to the apparatus 10.

Figure 5:
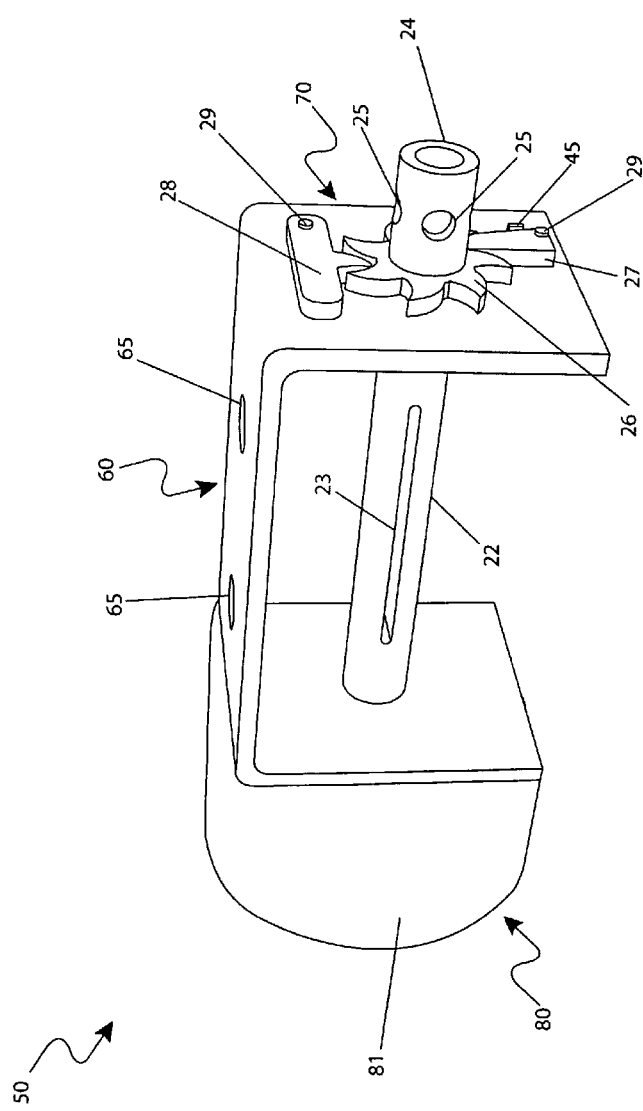

Referring now to FIG. 5, a front perspective view of an alternate retractable cargo strap 50, according to an alternate embodiment of the present invention, is disclosed. The alternate retractable cargo strap 50 comprises substantially similar materials, functions, and components as that of the apparatus 10 further comprising particular differences including a retractable cargo strap bracket 60, an alternate winch assembly 70, and an alternate spring assembly 80 as one (1) integral member. The alternate winch assembly 70 and the alternate outer spring case 81 are integrally a part of the retractable cargo strap bracket 60. The retractable cargo strap bracket 60 comprises a plurality of mounting apertures 65 which provide one (1) in a plurality of methods of mounting the alternate retractable cargo strap 50 thereto a trailer 110 including, but not limited to: welding, bolting, clamping, and the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2 and as an alternate embodiment as indicated in FIG. 5. The exact method for accomplishing this would vary depending on the type of winch in use.

The method of installing the apparatus 10 may be achieved by performing the following steps: removing the existing strap 105 from an existing trailer winch; preparing the mounting edges of the existing winch mounting bracket 100 such that the apparatus 10 can be welded thereto (see FIG. 1); inserting the winch shaft 22 therethrough the bracket shaft apertures 102; clamping the adaptor plate 21 of the winch assembly 20 to the existing winch mounting bracket 100; welding said adapter plate 21 thereto said winch bracket 100; positioning the winch shaft 22 thru the shaft aperture 36 in the outer spring case 31; inserting said winch strap 105 therethrough the strap aperture 23 and securing in a normal manner; winding said winch strap 105 therearound said winch shaft 22; insertingly connecting the keyed end 34 of said winch shaft 22 therewith the keyed aperture 33 of the spring coupling 32; fastening the fastener 43 thereto said keyed end 34 and said outer spring case 31; and, welding said outer spring 31 thereto said winch bracket 100.

The method of utilizing the apparatus 10 when securing a load 115 may be achieved by performing the following steps: pulling the winch strap 105 out therefrom said apparatus 10 far enough to go over the load 115 and reach the opposite side of the trailer 110; allowing the spring lock lever 27 to allow the winch lock gear 26 to rotate in a strap 105 deploying direction and preventing said winch lock gear 26 from rotating in a strap 105 retracting direction such that releasing the tension on said strap 105 will not allow said strap 105 from being wound back onto the winch shaft 22; positioning said strap 105 over said load 115 and attaching said strap 105 thereto the opposite side of said trailer 110; inserting the winch bar into the winch bar aperture 25 of the ratchet cap 24; tightening said winch strap 105 as desired; and, engaging the load lock lever 27 to said winch lock gear 26 such that said winch lock gear 26 will not rotate and allow said strap 105 to loosen.

The method of utilizing the apparatus 10 when un-securing the load 115 may be achieved by performing the following steps: disengaging the load lock lever 27 therefrom the winch lock gear 26; disengaging the spring lock lever 28 therefrom said winch lock gear 26; deploying a sufficient amount of the strap 105 to allow detaching of said strap 105 from the trailer 110; and, allowing the spring 40 to uncoil thereby automatically winding said strap 105 therearound the winch shaft 22.

The method of installing and utilizing the alternate retractable cargo strap 50 may be achieved by performing the following steps: mounting said alternate retractable cargo strap 50 to the trailer 110 using a desired mounting technique such as, welding, clamping, fastening utilizing the mounting apertures 65, or the like; and, utilizing said alternate retractable cargo strap 50 as described above for the apparatus when securing and un-securing the load 115.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A retractable cargo strap mechanism, comprising:
 a winch assembly, further comprising:
  an adapter plate comprising a flat plate;
  a winch shaft inserted through a central aperture of said adapter plate and extending rearwardly from and further comprising a cylindrical body with an elongated strap aperture, a first end, and a second end;
  a winch lock gear rigidly attached to said first end of said winch shaft and abutting an outside vertical surface of said adapter plate;
  a load lock lever hingedly attached to said adapter plate via a lever mounting pin subjacent to said winch lock gear;
  a spring lock lever hingedly attached to said adapter plate via a lever mounting pin superjacent to said winch lock gear; and,
  a ratchet cap located on said first end of said winch shaft adjacent to said winch lock gear, comprising a plurality of winch bar apertures;
 a spring assembly attached to said winch assembly; and,
 a backstop attached to said adapter plate adjacent to said load lock lever;
 wherein said mechanism is removably attached to an existing trailer winch bracket of a trailer;
 wherein said mechanism winds a cargo strap between a fully deployed position and a fully retracted position;
 wherein said mechanism disengages said cargo strap for retracting said cargo strap;
 wherein said mechanism secures said cargo strap in a desired position when said mechanism winds said cargo strap;
 wherein said mechanism assists in securing a load on said trailer;
 wherein said mechanism is mounted to a first portion of said trailer winch bracket with said adapter plate;
 wherein said winch shaft is freely rotatable in said central aperture of said adapter plate;
 wherein said elongated aperture of said winch shaft receives a first end of said cargo strap for retention therein;
 wherein said load lock lever secures said winch lock gear and said winch shaft when said cargo strap is at said desired position;
 wherein said spring lock lever prevents said winch lock gear and said winch shaft from rotating and retracting due to an exerted force by said spring assembly;
 wherein said winch bar apertures each receive a standard winch bar for assisting said winding means; and,
 wherein said backstop prevents said load lock lever from over rotating due to an applied force by said winch lock gear.

2. The mechanism of claim 1, wherein said load lock lever drops via gravity, thereby disengaging said winch lock gear and allowing said winch shaft and said winch lock gear to rotate unimpeded during said disengaging means.

3. The mechanism of claim 1, wherein said spring lock lever engages said winch lock gear during said winding means, thereby allowing one-way rotation thereof said winch lock gear.

4. The mechanism of claim 3, wherein said spring lock lever is manually rotated in an upward direction during said disengaging means, thereby completely disengaging said spring lock lever from said winch lock gear.

5. The mechanism of claim 1, wherein said spring assembly further comprises:

an outer spring case, comprising a shaft aperture for receiving said second end of said winch shaft;

a spring coupling freely rotatable in said outer spring case and attachable to a keyed portion of said second end of said winch shaft therein a keyed aperture; and, a spring fastened at a first end to a first spring-mounted slot of said spring coupling and at a second end to a second spring-mounted slot of an inner sidewall of said outer spring case;

wherein said mechanism is mounted to a second portion of said trailer winch bracket with said outer spring case;

wherein said outer spring comprises a housing for said spring;

wherein any rotational motion from said winch shaft is transferred to said spring coupling and to said spring;

wherein said spring compresses when said mechanism winds said cargo strap.

6. The mechanism of claim 5, wherein said spring coupling is attachable to a pair of spring coupling brackets located on a center region of an inner sidewall of said outer spring case, thereby maintaining a centrally-located position of said spring coupling.

7. The mechanism of claim 6, wherein said winch shaft is secured to said spring coupling with a fastener and a washer, thereby enabling rotation of said fastened spring coupling and said winch shaft.

8. The mechanism of claim 5, wherein said outer spring case further comprises a threaded first fastener aperture which threadably attaches to a threaded second fastener aperture of said second end of said winch shaft.

\* \* \* \* \*